(12) United States Patent
Lin et al.

(10) Patent No.: US 11,235,649 B1
(45) Date of Patent: Feb. 1, 2022

(54) FIXING AND MOUNTING STRUCTURE FOR VEHICLE COVER

(71) Applicant: Hangzhou Golden Sun Auto Parts Co., LTD., Hangzhou (CN)

(72) Inventors: Chenshan Lin, Hangzhou (CN); Shaoyong Zheng, Hangzhou (CN); Jinqin Fu, Hangzhou (CN); Xue'e Wang, Hangzhou (CN); Xiaohong Tang, Hangzhou (CN)

(73) Assignee: Hangzhou Golden Sun Auto Parts Co., LTD., Hangzhou (CN)

( * ) Notice: Subject to any disclaimer, the term of this patent is extended or adjusted under 35 U.S.C. 154(b) by 0 days.

(21) Appl. No.: 17/139,402

(22) Filed: Dec. 31, 2020

(30) Foreign Application Priority Data

Nov. 13, 2020 (CN) .......................... 202022638409.X

(51) Int. Cl.
*B60J 7/08* (2006.01)
*B60P 7/02* (2006.01)

(52) U.S. Cl.
CPC ............. *B60J 7/085* (2013.01); *B60P 7/02* (2013.01)

(58) Field of Classification Search
CPC ....................................................... B60J 7/085
USPC ............................................. 296/98, 100.09
See application file for complete search history.

(56) References Cited

U.S. PATENT DOCUMENTS

| 8,544,934 | B2 * | 10/2013 | Maimin | B60J 7/085 |
| | | | | 296/100.12 |
| 9,221,380 | B2 * | 12/2015 | Spencer | B60J 7/10 |
| 10,286,765 | B2 * | 5/2019 | Williamson | B60J 7/198 |

FOREIGN PATENT DOCUMENTS

CN          111645501 A       9/2020

\* cited by examiner

*Primary Examiner* — Joseph D. Pape
(74) *Attorney, Agent, or Firm* — Schwegman Lundberg & Woessner, P.A.

(57) ABSTRACT

The application discloses a fixing and mounting structure for a vehicle cover which includes a vehicle cover and two mounting rods. The two mounting rods are parallel to each other. The vehicle cover is laid on the two parallel mounting rods. The fixing and mounting structure further includes a front railing, a fixed bolt, a first slider, a second slider and a locking nut. The front railing is fixed on the vehicle cover. The first slider is slidably arranged on the front railing. The fixed bolt is arranged on the first slider. The locking nut is matched with the fixed bolt. A sliding hole is defined in the second slider, and the fixed bolt passes through the sliding hole in the second slider. The locking nut abuts against the second slider, and the second slider cooperates with the front railing to clamp the mounting rods. The disclosure has following advantageous effects that: a fastening between the vehicle cover and the mounting rods is realized by actions of the first slider, the second slider, the fixed bolt and the locking nut, so that a fastening strength and position between the vehicle cover and the mounting rod is adjustable.

8 Claims, 4 Drawing Sheets

FIXING AND MOUNTING STRUCTURE FOR VEHICLE COVER

CROSS-REFERENCE TO RELATED APPLICATIONS

This Non-provisional application claims priority under 35 U.S.C. § 119(a) to Chinese Patent Application No. 202022638409.X filed on Nov. 13, 2020, the entire contents of which are hereby incorporated by reference in their entirety.

TECHNICAL FIELD

The disclosure relates to the field of automobile parts, in particular to a fixing and mounting structure for a vehicle cover.

BACKGROUND ART

Nowadays, in order to transport goods in rainy and snowy weather, a pickup truck generally is chosen to be installed with a cover on its cargo bed for waterproofing. A fully-embedded vehicle cover used on the cargo bed of the pickup truck is provided in Patent CN111645501A. However, the fully-embedded vehicle cover is fixedly mounted with a clamping device and its mounting position cannot be adjusted, with a large adaptability in use.

SUMMARY

In view of the above problems, the present disclosure provides a fixing and mounting structure for a vehicle cover.

Technical schemes adopted in the disclosure is as follows.

The fixing and mounting structure for the vehicle cover includes a vehicle cover and two mounting rods. The two mounting rods are parallel to each other. The vehicle cover is laid on the two parallel mounting rods. The fixing and mounting structure further includes a front railing, a fixed bolt, a first slider, a second slider and a locking nut. The front railing is fixed on the vehicle cover. The first slider is slidably arranged on the front railing. The fixed bolt is arranged on the first slider. The locking nut is matched with the fixed bolt. A sliding hole is defined in the second slider, and the fixed bolt passes through the sliding hole in the second slider. The locking nut abuts against the second slider, and the second slider cooperates with the front railing to clamp the mounting rods.

In this structure, the first slider can slide relative to the front railing and the fixed bolt is fixed on the first slider, while the second slider can slide relative to the fixed bolt. The front railing cooperates with the second slider to clamp the mounting rods, and when the front railing cooperates with the second slider to clamp the mounting rods, the vehicle cover is fixed on the mounting rods which are connected with the cargo bed of a pickup truck. Therefore, in the above structure, a fastening between the vehicle cover and the mounting rods is realized by actions of the first slider, the second slider, the fixed bolt and the locking nut, so that a fastening strength and position between the vehicle cover and the mounting rod can be more conveniently and stably adjusted. Specifically, the fixed bolt is a T-shaped fixed bolt, so that the fixed bolt can be smoother upon sliding.

Optionally, it also includes a buckle which is fixedly arranged on the front railing.

The buckle is set to facilitate fixing the vehicle cover after the vehicle cover is rolled up.

Optionally, it also includes a rubber gasket which is arranged on the buckle.

The rubber gasket functions to protect the buckle, so as to prevent the buckle from damages caused by an impact of heavy objects.

Optionally, it also includes a front railing rubber strip which is inserted and fixed on the front railing.

The front railing rubber strip serves to seal and protect against rain.

Optionally, the vehicle cover includes profiles and connecting rubber strips, two adjacent profiles are rotationally and sealingly matched with the connecting rubber strips.

The vehicle cover is assembled by the profiles and the connecting rubber strips so as to be capable of rolling up and ensure a good waterproof performance.

Optionally, the profiles are parallel to each other, and the connecting rubber strips are kept parallel to the profiles.

Optionally, the profile is provided with a fitting groove, the connecting rubber strip is provided with a fitting part, and the fitting part and the fitting groove are sealingly fitted together.

By sealingly fitting the fitting groove and the fitting part, both a good sealing performance between the profiles and the connecting rubber strips and a good roll-up performance between the profiles and the connecting rubber strips can be ensured.

Optionally, the mounting rods are perpendicular to the profiles and the connecting rubber strips.

The disclosure presents following advantageous effects that: a fastening between the vehicle cover and the mounting rods is realized by actions of the first slider, the second slider, the fixed bolt and the locking nut, so that a fastening strength and position between the vehicle cover and the mounting rod can be more conveniently and stably adjusted.

Figure 1:
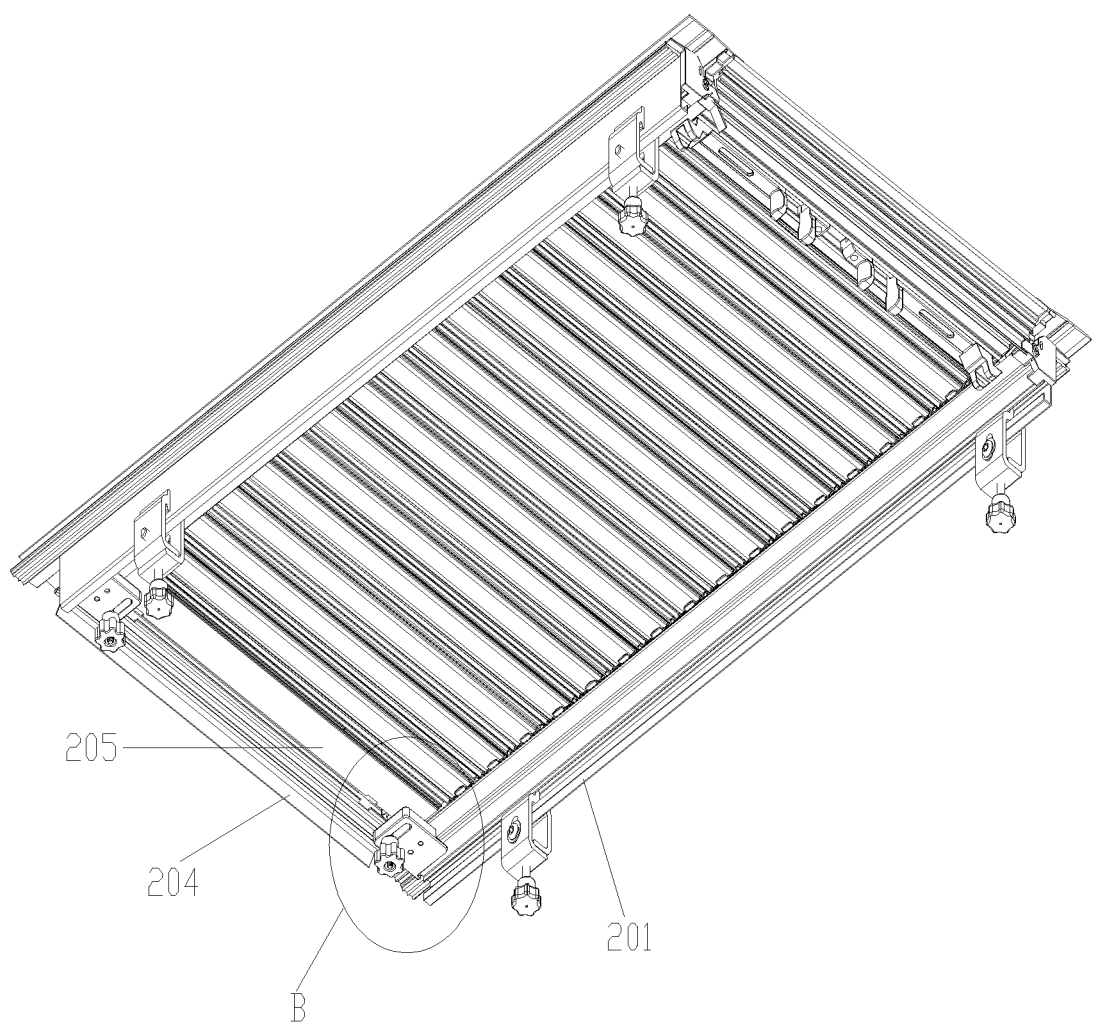
FIG. 1 is a schematic diagram of a fixing and mounting structure for a vehicle cover according to the disclosure.

The reference numerals in the figures are: 101. Profile, 10101. Fitting Groove, 103. Connecting Rubber Strip, 10301. Fitting Part, 201. Mounting Rod, 202. Buckle, 203, Rubber Gasket, 204. Front Railing Rubber Strip, 205. Front Railing, 206. First Slider, 207. Fixed Bolt, 208. Locking Nut, 209. Second Slider, 2010. Sliding Hole.

DETAILED DESCRIPTION

The present disclosure will be described in detail with reference to the accompanying drawings.

Figure 2:
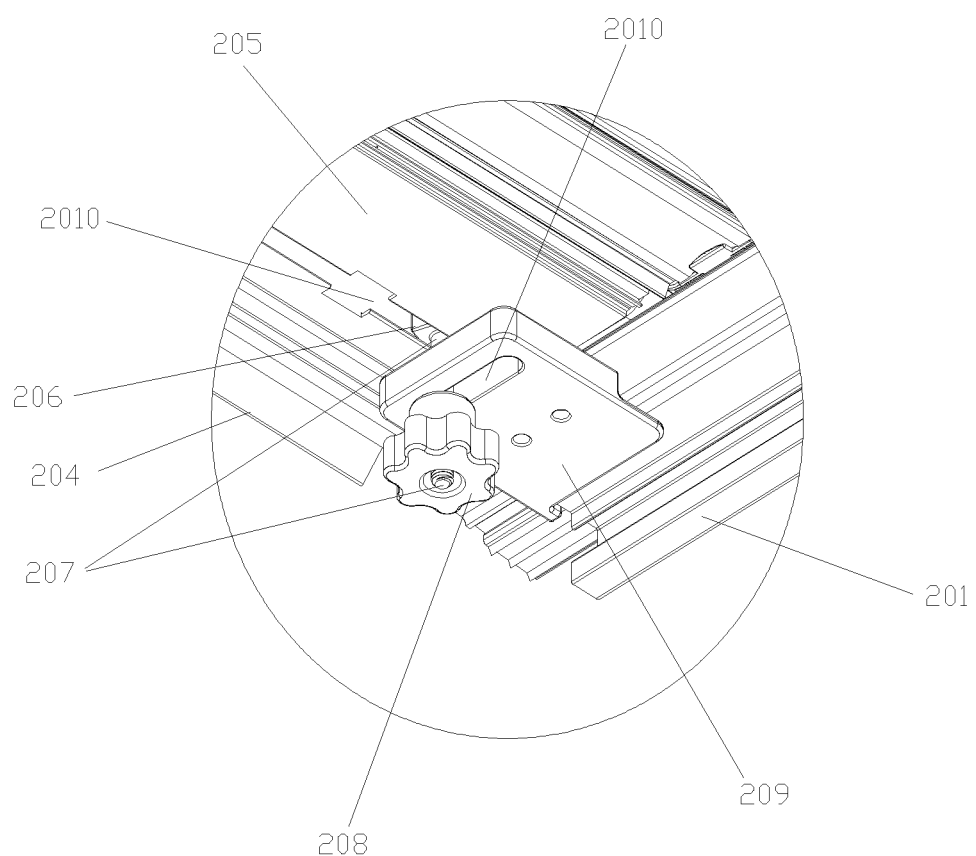
FIG. 2 is an enlarged schematic diagram at B in FIG. 1.
Figure 3:
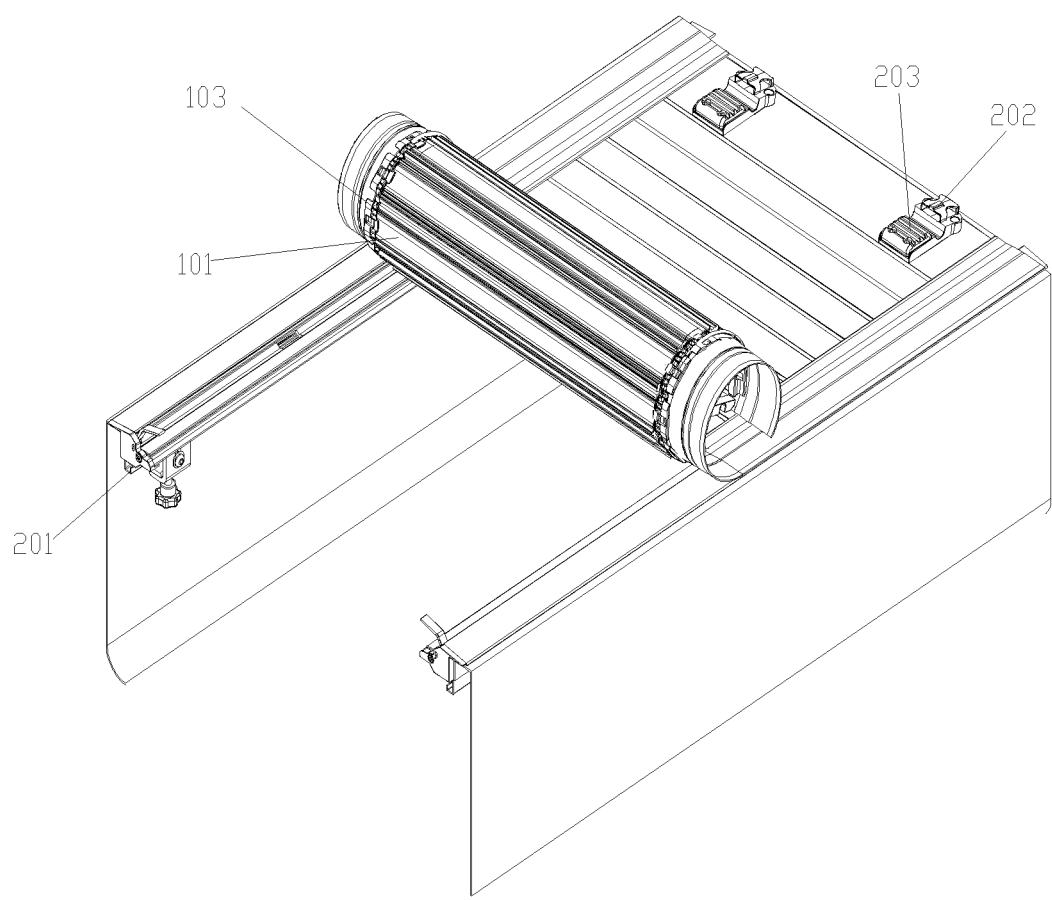
FIG. 3 is a schematic diagram of a positional relationship between the vehicle cover and the mounting rod.

As shown in FIGS. 1, 2 and 3, a fixing and mounting structure for a vehicle cover includes a vehicle cover and two mounting rods 201. The two mounting rods 201 are parallel to each other. The vehicle cover is laid on the two parallel mounting rods 201. The fixing and mounting structure further includes a front railing 205, a fixed bolt 207, a first slider 206, a second slider 209 and a locking nut 208. The front railing 205 is fixed on the vehicle cover. The first slider 206 is slidably arranged on the front railing 205. The fixed bolt 207 is arranged on the first slider 206. The locking nut is matched with the fixed bolt 207. A sliding hole 2010 is defined in the second slider 209, and the fixed bolt 207 passes through the sliding hole 2010 in the second slider 209. The locking nut abuts against the second slider 209, and the second slider 209 cooperates with the front railing 205 to clamp the mounting rods 201.

In this structure, the first slider 206 can slide relative to the front railing 205 and the fixed bolt 207 is fixed on the first slider 206, while the second slider 209 can slide relative to the fixed bolt 207. The front railing 205 cooperates with the second slider 209 to clamp the mounting rods 201, and when the front railing 205 cooperates with the second slider 209 to clamp the mounting rods 201, the vehicle cover is fixed on the mounting rods 201 which are connected with the cargo bed of a pickup truck. Therefore, in the above structure, a fastening between the vehicle cover and the mounting rods 201 is realized by actions of the first slider 206, the second slider 209, the fixed bolt 207 and the locking nut 208, so that a fastening strength and position between the vehicle cover and the mounting rods 201 can be more conveniently and stably adjusted. Specifically, the fixed bolt 207 is a T-shaped fixed bolt 207, so that the fixed bolt 207 can be smoother upon sliding.

As shown in FIG. 3, it also includes a buckle 202 which is fixedly arranged on the front railing 205.

The buckle 202 is set to facilitate fixing the vehicle cover after the vehicle cover is rolled up.

As shown in FIG. 3, it also includes a rubber gasket 203 which is arranged on the buckle 202.

The rubber gasket 203 functions to protect the buckle 202, so as to prevent the buckle 202 from damages caused by an impact of heavy objects.

As shown in FIGS. 1 and 2, it also includes a front railing rubber strip 204 which is inserted and fixed on the front railing 205.

The front railing rubber strip 204 serves to seal and protect against rain.

Figure 4:
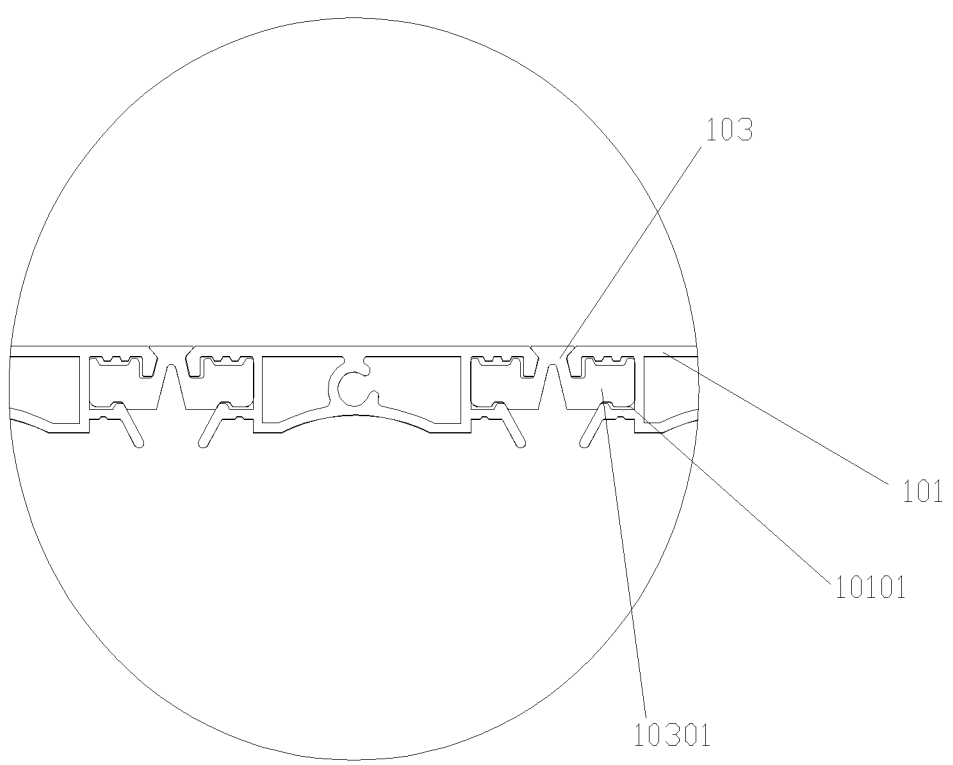
FIG. 4 is a schematic diagram of a matching relationship between profiles and connecting rubber strips.

As shown in FIGS. 2 and 4, the vehicle cover includes profiles 101 and connecting rubber strips 103, two adjacent profiles 101 are rotationally and sealingly matched with the connecting rubber strips 103.

The vehicle cover is assembled by the profiles 101 and the connecting rubber strips 103 so as to be capable of rolling up and ensure a good waterproof performance.

As shown in FIG. 2, the profiles 101 are parallel to each other, and the connecting strips 103 are kept parallel to the profiles 101.

As shown in FIGS. 2 and 4, the profile 101 is provided with a fitting groove 10101, the connecting rubber strip 103 is provided with a fitting part 10301, and the fitting part 10301 and the fitting groove 10101 are sealingly fitted together.

By sealingly fitting the fitting groove 10101 and the fitting part 10301, both a good sealing performance between the profiles 101 and the connecting rubber strips 103 and a good roll-up performance between the profiles 101 and the connecting rubber strips 103 can be ensured.

As shown in FIGS. 1 and 2, the mounting rods 201 are perpendicular to the profiles 101 and the connecting strips 103.

The above is only preferred embodiments of the present disclosure, which does not limit a protection scope of the present disclosure. Any equivalent transformation made with the specification of the present disclosure, which is directly or indirectly applied to other related technical fields, is included within the scope of the disclosure.

What is claimed is:

1. A fixing and mounting structure for a vehicle cover comprising a vehicle cover and two mounting rods, the two mounting rods being parallel to each other and the vehicle cover being laid on the two parallel mounting rods,
   wherein the fixing and mounting structure further comprises a front railing, a fixed bolt, a first slider, a second slider and a locking nut,
   wherein the front railing is fixed on the vehicle cover, the first slider is slidably arranged on the front railing, the fixed bolt is arranged on the first slider, the locking nut is matched with the fixed bolt, a sliding hole is defined in the second slider, the fixed bolt passes through the sliding hole in the second slider, the locking nut abuts against the second slider, and the second slider cooperates with the front railing to clamp the mounting rods.

2. The fixing and mounting structure for the vehicle cover according to claim 1, further comprising a buckle which is fixedly arranged on the front railing.

3. The fixing and mounting structure for the vehicle cover according to claim 2, further comprising a rubber gasket which is arranged on the buckle.

4. The fixing and mounting structure for the vehicle cover according to claim 1, further comprising a front railing rubber strip which is inserted and fixed on the front railing.

5. The fixing and mounting structure for the vehicle cover according to claim 1, wherein the vehicle cover comprises profiles and connecting rubber strips, two adjacent profiles being rotationally and sealingly matched with the connecting rubber strips.

6. The fixing and mounting structure for the vehicle cover according to claim 5, wherein the profiles are parallel to each other, and the connecting rubber strips are kept parallel to the profiles.

7. The fixing and mounting structure for the vehicle cover according to claim 5, wherein the profile is provided with a fitting groove, the connecting rubber strip is provided with a fitting part, and the fitting part and the fitting groove are sealingly fitted together.

8. The fixing and mounting structure for the vehicle cover according to claim 5, wherein the mounting rods are perpendicular to the profiles and the connecting rubber strips.

* * * * *